Feb. 28, 1967   H. A. PÜSCHNER   3,307,010
ARRANGEMENTS FOR THE TREATMENT OF GOODS BY
MICROWAVES, ESPECIALLY IN A
CONTINUOUS PROCESS
Filed Nov. 19, 1964

INVENTOR

HERBERT AUGUST PÜSCHNER by Wolf, Greenfield & Hicken

ARRANGEMENTS FOR THE TREATMENT OF
GOODS BY MICROWAVES, ESPECIALLY IN
A CONTINUOUS PROCESS

Herbert A. Püschner, Bremen-Lesum, Germany
(175 Osterholzer Heerstrasse, Bremen 2, Germany)
Filed Nov. 19, 1964, Ser. No. 412,522
20 Claims. (Cl. 219—10.55)

The invention relates to arrangements for the treatment of goods by microwaves, especially in a continuous process.

In various branches of industry, for example the foodstuffs industry, plastics industry and so on, hot air installations, infra-red installations or high frequency installations are used for heating and drying of bulk goods, or for the heating of liquids. As a rule, the goods are passed through a heating zone on a transport belt. Infrared installations and hot air installations have essentially the disadvantage of a low efficiency and a long heating time, both caused by the convective transfer of the heat into the interior of the goods. Moreover, such heating arrangements require a large amount of space and the disadvantage exists that the heating arrangement itself is also heated and accordingly has to be provided with thermal insulation. High frequency heating operates with essentially greater efficiency and shorter heating times. The cross sectional area of the conduit is limited however by the maximum breakdown field strength which can be achieved.

Known arrangements for the treatment of goods by means of microwaves, make use of a tube for the passage of the goods to be treated, which lies in the axis of a circular cavity guide.

It is an object of the invention to provide an arrangement for the treatment of goods by microwaves, in which a favourable energy distribution and a high efficiency can be achieved.

It is another object of the invention to provide such an arrangement in which the microwave treatment is performed in a ring shaped space, which is preferably formed by the intermediate space of a coaxial tube representing part of a wave guide system. Compared with the internal space of a simple tube, such an arrangement has the advantage that the goods pass through the wave guide system in a uniform layer thickness and are thus homogeneously heated. Furthermore, the advantage exists that the cross sectional area of the conduit, and hence its capacity, can be essentially increased compared with an arrangement having a simple tube, since for efficient heating a simple tube could not have a diameter greater than about 15 mm.

The arrangement according to the invention is suited for the heating and drying of bulk goods, for example corn, rolled oats, plastics granulate and so on. It can for example be used in connection with corn for pest control, since insects are heated essentially faster in the electromagnetic radiation field, as a result of their water content, and are exterminated as a result of the intense internal heat development.

Bulk goods can be advantageously guided through the annular chamber in the axial direction. For axial feeding of the goods, the annular chamber may merge into a feed pipe by conically tapering parts of the inner and outer tubes defining the chamber.

Furthermore, the advantageous possibility exists of moving the goods not in the axial direction, but alternatively in the peripheral direction relative to the microwave radiation system. Such a circular-path guidance enables more particularly the use of the arrangement for the treatment of web-shaped goods. For this purpose, the annular chamber may be provided at its periphery with connection channels for guiding the goods in and out. For the treatment of web-shaped goods, the connection channels may open onto the annular chamber with slot-shaped openings which extend over the length of the annular chamber. The arrangement can also be so constructed that the goods are guided along a spiral or helical path through the annular chamber.

By means of a sleeve portion of the inner tube, which rotates with the goods, a substantially friction-free guiding of the goods through the treatment chamber can be achieved. In this respect, the rotatable sleeve may be formed as a free roller which is to be driven by the goods, or may be formed as a drive roller for the goods.

Both with axial and circular guidance of the goods, the sleeve portion of the inner tube is preferably so formed that it effects matching to the goods. Furthermore, the outer tube may be formed as an absorber or as a reflector.

The inner wall of the annular chamber can be coated with a synthetic plastic material, preferably polytetrafluorethylene. With use of a synthetic plastic coating of predetermined thickness, the matching to the goods can be simultaneously effected thereby, so that a uniform energy transfer to the goods can be achieved.

For transferring the wave energy to the annular treatment chamber, a wave guide or a plurality of wave guides one behind the other may be arranged in the inner tube, which radially radiate into the annular chamber the energy fed in from the microwave generators.

A ring shaped radial wave guide the wall spacing of which can be increased towards the outside is preferably connected to the said transferring wave guides. It is thus possible in practice to select the diameter of the annular treatment chamber to be as large as desired. The radial wave guides can be fed through an axial wave guide, preferably in the form of a coaxial line.

The microwave generators may be provided in the space between two adjacent radial wave guides. If however the microwave generators are arranged outside the coaxial treatment chamber, then for supplying the energy, a wave guide which passes radially through the annular chamber, preferably a rectangular hollow guide with a narrow profile may be provided.

The above and other objects and advantages of the invention will be clear from the following description taken with reference to the accompanying drawings which are given by way of example and in which.

Figure 1:
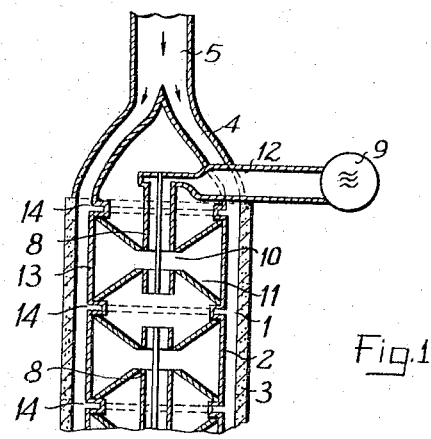
FIG. 1 is a longitudinal sectional view of an arrangement according to the invention, for axial passage of the goods to be treated.

The arrangement illustrated in FIG. 1 serves advantageously for the treatment of bulk goods, which are guided in the axial direction through a ring shaped treatment chamber 1 which is formed by an inner sleeve 2 and the outer sleeve 3 of a coaxial tube. The annular chamber 1 is connected to a supply pipe 5 through a conically tapering transition part 4, and a conically shaped transition part 6 connecting the chamber 1 to an outlet pipe 7 is provided at the outlet side. The entire arrangement can be disposed vertically or at an inclination, so that the goods fall through the system under gravity.

A plurality of coaxial wave guides 8 are arranged one after the other in the inner tube, and through annular openings 10 they radially radiate the energy which is fed in from microwave generators 9. In each case, a ring shaped radial wave guide 11, the wall spacing of which can be increased towards the outside, is connected to each of these wave guides 8 by means of their openings 10.

The microwave generators 9 may be arranged in the inner tube 2 as shown at the bottom of FIG. 1, or they may be disposed at the outer side of the treatment chamber 1 as illustrated at the top of FIG. 1, a wave guide 12, preferably a rectangular hollow guide with narrow profile, which passes radially through the annular chamber 1, then being provided for supplying the energy.

The radial wave guides 11 are so formed that their ring shaped openings 13 which border on the treatment chamber 1 adjoin each other.

Blocking filters and possibly additional damping filters 14 are provided at the ends of the inner tube 2 and between the adjoining radial wave guides or their openings 13.

In order to avoid collision regions in transfer of the energy into the goods to be treated, the sleeve portion of the inner tube 2 is provided with a dielectric of predetermined thickness in the region of the outlet openings 13, which effects the energy matching to the goods.

The outer tube 3 in the arrangement shown in FIG. 1 is provided with an absorber 15. Instead of the absorber, a reflector may be provided, if the power reflected in the generator remains small enough.

The inner wall of the annular chamber 1, and if desired also the pipes 5 and 7 may be covered with a synthetic plastic material, preferably polytetrafluorethylene, more particularly for reducing the friction of the goods during transition.

Figure 2:
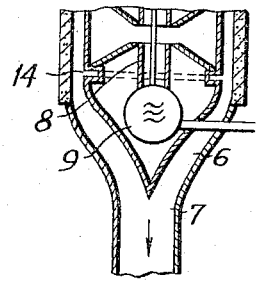
FIG. 2 is an axial sectional view of an embodiment of the arrangement, with circular guiding of the goods.
Figure 3:
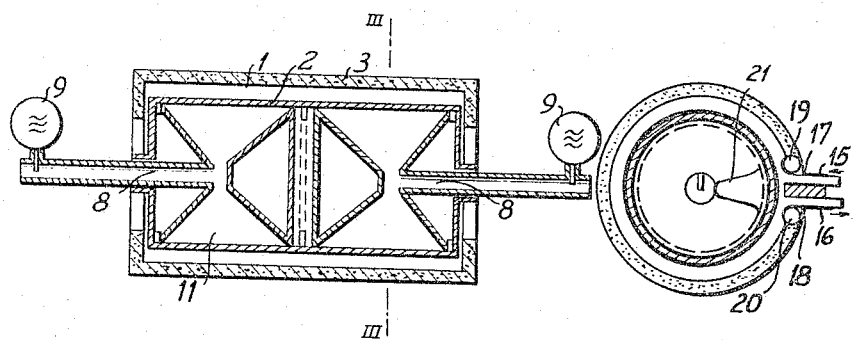
FIG. 3 is a cross sectional view along the line III—III of FIG. 2.

In the embodiment illustrated in FIGS. 2 and 3, the goods to be treated are of web-like form and are guided in a circular path through the annular chamber, so that they are moved in the peripheral direction relative to the radiation system. The annular chamber is provided at its periphery with connection channels 15 and 16 for introduction and removal of the goods. These connection channels open into the annular chamber 1 with slot-shaped openings 17 and 18 which extend over the entire length of the annular chamber. Guide rollers 19 and 20 are provided for guiding the goods at the inlet and exit.

As in the first embodiment, the microwave energy from the generators 9 is transferred to the web-shaped goods through axial wave guides 8 and subsequent radial wave guides 11.

The inner tube 2, which for reasons of matching is made of a dielectric of predetermined thickness, is mounted freely rotatably on the axial wave guides 8, so that it can be driven by the goods running through the treatment chamber. The outer tube 3, as in the embodiment of FIG. 1, may be formed as an absorber or reflector.

In order to prevent escape of the microwave energy in the region of the inlet and outlet guides for the goods to the treatment chamber, this region is covered by a metallic sector-shaped wall 21.

Many modifications are possible. For example, with circular guidance of the goods, alternatively the inner tube may be in the form of a driven roller.

With a fixed arrangement of the inner tube, advantageously a polytetrafluoroethylene coating is provided thereon in order to reduce friction.

The annular treatment chamber, instead of being formed by the inner and outer sleeve portions of a coaxial tube, may alternatively be defined either at the inner or outer side by the goods to be treated, especially if the goods to be treated are of annular or tubular shape. Furthermore, the possibility exists of feeding the microwave energy to the treatment chamber from the outside instead of from the inside.

I claim:

1. Microwave heating apparatus comprising,
   outer and inner coaxial conducting surfaces defining an annular volume therebetween for receiving material for heating,
   means defining a material inlet to said annular volume,
   means defining a material outlet from said volume,
   axial waveguide means inside said coaxial conducting surfaces embracing the common axis thereof,
   and radial waveguide means intercoupling and disposed between said annular volume and said axial waveguide means for coupling energy from said axial waveguide means to said annular volume.

2. Microwave heating apparatus in accordance with claim 1 and further comprising,
   a source of microwave energy coupled to said axial waveguide means,
   and means including said axial waveguide means and said radial waveguide means for matching said source to said annular volume.

3. Microwave heating apparatus in accordance with claim 1 wherein said inlet and said outlet are formed in said outer conducting surface angularly displaced about said axis and further comprising,
   means for moving material angularly about said axis from said inlet through said annular volume in a path just outside the perimeter of said inner conducting surface.

4. Microwave heating apparatus in accordance with claim 3 wherein said means for moving comprises means for rotating at least one of said inner and outer conducting surfaces about said axis and causing said at least one rotating surface to engage said material.

5. Microwave heating apparatus in accordance with claim 4 wherein said at least one surface comprises a sleeve portion of said inner conducting surface.

6. Microwave heating apparatus in accordance with claim 5 and further comprising,
   means for supporting said sleeve portion for free rotation about said axis in response to movement of said material angularly about said axis through said annular volume.

7. Microwave heating apparatus in accordance with claim 4 wherein said sleeve portion comprises means for driving said material through said annular volume and further comprising,
   a source of rotative power coupled to said sleeve portion for rotating the latter about said axis.

8. Microwave heating apparatus in accordance with claim 7 and further comprising,
   a source of microwave energy coupled to said axial waveguide means,
   and means including said axial waveguide means and said radial waveguide means for inhibiting the reflection of microwave energy back to said source and enhancing absorption of said energy by said material in said annular volume.

9. Microwave heating apparatus in accordance with claim 1 wherein said inlet is above said annular volume and said outlet is below said annular volume and further comprising,
   means supporting said inlet above and said outlet below said annular volume for enabling the force of gravity to draw material for heating through said volume.

10. Microwave heating apparatus in accordance with claim 9 and further comprising,
    a source of microwave energy coupled to said axial waveguide means,
    and means including said axial waveguide means and said radial waveguide means for inhibiting the reflection of microwave energy back to said source and enhancing absorption of said energy by said material in said annular volume.

11. An arrangement for the treatment of goods by microwaves comprising,
    means defining an annular chamber for passage of the goods,
    means for feeding microwave energy to the annular chamber,
    said chamber defining means comprising a coaxial tube arrangement having an inner tube and an outer tube, the intermediate space of which constitutes said chamber, means for feeding the goods in the annular chamber in the peripheral direction relative to the microwave feeding means, said annular chamber being provided at its periphery with connection channels for guiding the goods into and out of the chamber, said connection channels opening into the annular chamber with slot-shaped openings which extend over the length of the annular chamber for the treatment of web-shaped goods.

12. An arrangement for the treatment of goods by microwaves comprising, means defining an annular chamber for passage of the goods, means for feeding microwave energy to the annular chamber, said chamber defining means comprising a coaxial tube arrangement having an inner tube and an outer tube, the intermediate space of which constitutes said chamber, means for feeding the goods in the annular chamber in the peripheral direction relative to the microwave feeding means, said annular chamber being provided at its periphery with connection channels for guiding the goods into and out of the chamber, and means for guiding the goods along a spiral path through the annular chamber.

13. An arrangement as defined in claim 12, wherein the rotatable sleeve portion is formed as a roller which is freely driven by the goods.

14. An arrangement as defined in claim 12, wherein the rotatable sleeve portion is formed as a driven roller for the goods.

15. An arrangement for the treatment of goods by microwaves comprising, means defining an annular chamber for passage of the goods, means for feeding microwave energy to the annular chamber, said chamber defining means comprising a coaxial tube arrangement having an inner tube and an outer tube, the intermediate space of which constitutes said chamber, means for feeding the goods in the annular chamber in the peripheral direction relative to the microwave feeding means, said feeding means comprising a sleeve portion of the inner tube which rotates with the goods.

16. An arrangement for the treatment of goods by microwaves comprising, means defining an annular chamber for passage of the goods, means for feeding microwave energy to the annular chamber, said chamber defining means comprising a coaxial tube arrangement having an inner tube and an outer tube, the intermediate space of which constitutes said chamber, at least one axial waveguide arranged to radially radiate microwave energy fed in from at least one microwave generator arranged in the inner tube, and ring shaped radial waveguides connected to the said axial waveguides.

17. An arrangement as defined in claim 16, wherein the wall spacing of the radial wave guides can be increased towards the outside.

18. An arrangement as defined in claim 17, wherein for the supply of energy, a rectangular hollow wave guide with narrow profile is provided, which extends radially through the annular chamber.

19. An arrangement as defined in claim 16, wherein blocking filters are provided between two adjacent radial wave guides.

20. An arrangement for the treatment of goods by microwaves comprising, means defining an annular chamber for passage of the goods, means for feeding microwave energy to the annular chamber, said chamber defining means comprising a coaxial tube arrangement having an inner tube and an outer tube, the intermediate space of which constitutes said chamber, and blocking filters and possibly additional damping filters at the ends of the inner tube.

References Cited by the Examiner

UNITED STATES PATENTS 2,442,114  5/1948  Brown _____ 219—10.55

FOREIGN PATENTS 835,778  8/1950  Germany.
933,046  3/1955  Germany.

RICHARD M. WOOD, Primary Examiner.

L. H. BENDER, Assistant Examiner.